Jan. 12, 1926. 1,569,124
J. A. H. HATT
PROCESS AND MEANS FOR MAKING PHOTOMECHANICAL PRINTING PLATES
Filed August 4, 1920
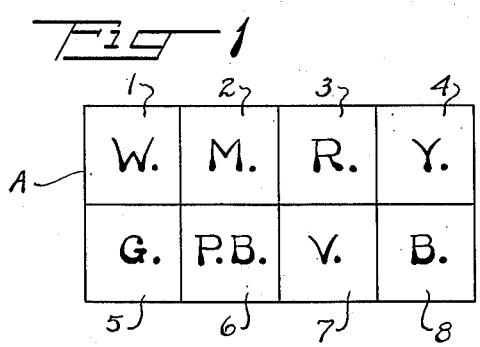
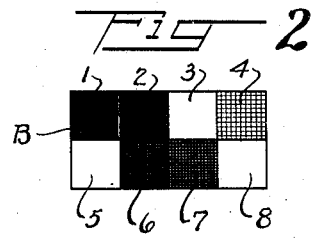
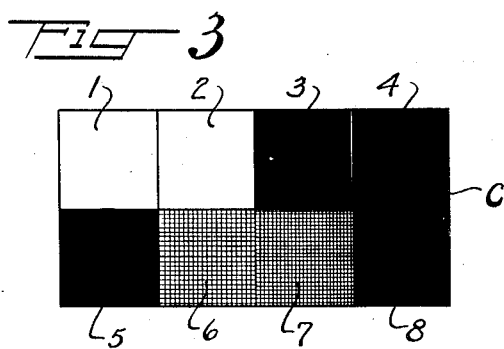
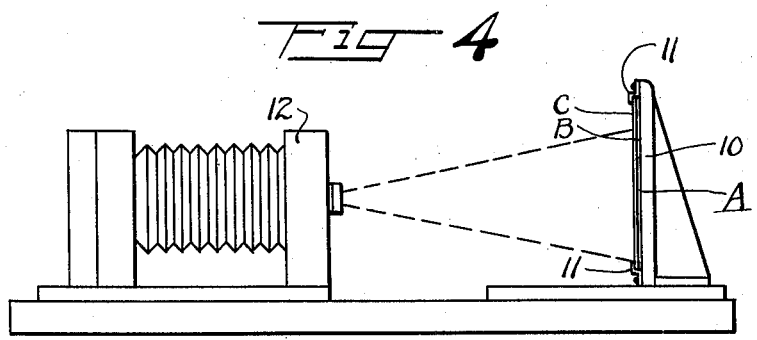
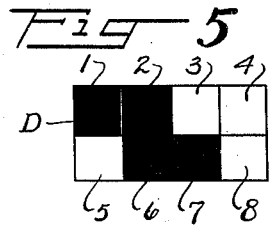
INVENTOR
J. A. H. Hatt
BY John D. Morgan
ATTORNEY Patented Jan. 12, 1926.

1,569,124

UNITED STATES PATENT OFFICE.

JOSEPH A. H. HATT, OF NEW YORK, N. Y.

PROCESS AND MEANS FOR MAKING PHOTOMECHANICAL PRINTING PLATES.

Application filed August 4, 1920. Serial No. 401,180.

*To all whom it may concern:*

Be it known that JOSEPH A. H. HATT, a resident of the city of New York, State of New York, has made certain new and useful Improvements in Processes and Means for Making Photomechanical Printing Plates, of which the following is a specification.

The invention relates to a novel process of producing photo-mechanical printing plates, and to novel means for use in such process, whereby negatives are obtained directly from a color original, such as a painting, for example, which negatives are correct in their color values and require no supplementary corrective work, either manual or otherwise, upon either the negatives or upon the printing plates made therefrom.

The invention consists in the novel means and instrumentalities and steps and processes hereinafter set forth.

Objects and advantages of the invention will be in part further set forth hereinafter, and in part will be obvious herefrom, or may be learned by those skilled in the art through practicing the invention.

The accompanying drawing, herein referred to and constituting a part hereof, illustrates somewhat diagrammatically the process and certain of the means employed, the drawing together with the description serving to explain the principles of the invention.

Fig. 1 is a diagrammatic representation of the original;

Fig. 2 is a similar representation of an uncorrected negative of the yellow of the original;

Fig. 3 is a similar representation of the intensified correction plate made from the yellow negative of Fig. 2;

Fig. 4 shows the making of the corrected negative from the original through the correction plate;

Fig. 5 is a diagrammatic representation of the true negative made in Fig. 4.

In the diagrammatic drawings the original A is represented as a color chart, the white being represented by 1, the magenta by 2, the red by 3, the yellow by 4, the green by 5, the peacock blue by 6, the violet by 7 and the black by 8. The degrees of opacity of the different colors in a given series of negatives and positives are represented as nearly as may be, in an exemplary case, by the cross-lining in the corresponding squares in the different figures.

It is well known that color process negatives, that is, negatives for use in making photo-mechanical process printing plates for multi-color printing, from the standpoint of results obtained in printing with the best or standard inks used or obtainable, are deficient in proper or correct color values.

This may be otherwise expressed by stating that the relative optical effects and the relative actinic effects of the various colors of the original are not identical or in the same ratios the one with the other; and photo-mechanical color plates made by heretofore known processes produce negatives which represent the relative actinic effects of the colors while the original presents to the eye the optical effect of the colors.

To secure in the printing plates the correct relative optical effects, the relative actinic effects must be changed either in the color negatives or in the printing plates made therefrom, this being done by supplementary manual and highly skilled work performed thereon. By my new process, color negatives are produced directly from an original such as a painting or other colored subject, which are correct in their color values, neither the negatives nor the printing plates made therefrom requiring any corrective work thereon in order to reproduce faithfully or correctly the colors of the original. This may be expressed by stating that by my process the relative actinic effect of the colors in the color negative for the printing plates is the same or in the same ratio as the optical effect of the colors in the original.

More in detail, by the usual processes, the blue negative, made through the red color filter is comparatively, and commercially acceptably, correct as to color value. The yellow negative, made through the violet color filter is less correct, being deficient in its representation of the violets, purples and blues. In addition, there is a tendency of the yellow colors to photograph too lightly. The magenta negative, made through the green color filter, is very deficient in the greens and the blues.

To correct the color values of the negatives for use in making three and four color printing plates, or other color plates, the present practice is, as stated to use skilled handwork on the negatives themselves, or on the positives made from them or on the printing plates made from such negatives or positives. By my invention, I produce by direct photographing from the original a series of color negatives in which the relative effects of the colors are correctly and faithfully reproduced in the negatives as so photographed from the original. Thus the usual subsequent troublesome, expensive and time-consuming supplemental or corrective work, either manual or otherwise, upon the negatives themselves, or upon positives or printing plates made therefrom, is unnecessary.

In carrying out my invention, as one feature thereof, I produce a photographic correcting plate, which is placed in front of and in contact with the original while the color negatives are made therefrom in the camera. The corrective plate is made exactly the same size as the original. By means of this corrective plate, a direct half tone negative can be made through a half tone screen placed in the camera, the negative having the desired color corrections or modifications effected by the photographic corrective plate.

This correcting plate is of suitable transparent material, such as glass or celluloid, and carries on its face which is in contact with the original on the copyboard of the camera, a negative or a positive, which is either white or black in color, or in certain cases may be an intermediate tone, the original being photographed through the corrective plate, and thereby a negative or negatives are produced having correct color values for making a printing plate or plates such as will, without subsequent corrective work in either the negative or plate, produce with standard inks as correct and faithful a copy of the original as is possible with the best obtainable inks.

Referring now in detail to the preferred form of practicing my invention, as at present advised, I first make a negative or a positive, preferably a small one, of the original under conditions (such for example as the employment of color filters, of masked negatives, or of plates of proper color sensitiveness) which will give the desired corrections for a particular negative or negatives from the copy. The desired corrections referred to, for example, would include brightening the greens and blues in the magenta negative for three color work, or brightening the greens, blues and blacks in the magenta negative for four color work, or such other corrections as will be found necessary by experience or such as are known to those skilled in the art.

As this correcting negative or positive is preferably made of small size, an enlargement thereof is made to the exact size of the original, this being done preferably on a wet collodion plate. This wet collodion plate, after development and fixation, is bleached until white. This may be satisfactorily effected with the usual mercury intensifier. This plate or negative so bleached may be dried in this condition, after being varnished, for which a gum arabic varnish will be found satisfactory. The corrective plate with a color or color value an opaque white or a more or less translucent white is used to eliminate or to tone down or otherwise modify or correct a color value in the final or plate making negative.

For certain uses, as for instance, emphasizing a color value or values on the final negative, the plate or negative may be blackened instead of being left white, and this may be done with an ammonia solution, and the plate or negative may then be varnished. This correcting plate in either form is then ready to be placed in contact with the face of the original for the making of the negative for the particular color, from which negative so made a correct or truthful printing plate may be made directly, as stated, without supplementary hand work on either the negative or the printing plate.

For further example, by making a positive of the black portions of the picture and bleaching the positive white and then interposing it between the copy and the color negative to be made therefrom, and preferably placing it in contact with the copy, the negative made therefrom will show no black.

Taking by way of example, the making of a particular color plate in accordance with the process as described, it is necessary or desirable to fully preserve, or to emphasize, the yellows of the original, which are usually too light in any negative made direct from the original. A small negative B (Fig. 2) is made from the original A (Fig. 1) on an ordinary plate, such as a dry plate or a wet collodion plate, through a violet color filter.

This produces a continuous toned negative of the yellow of the original. An enlarged positive C (Fig. 3) is then made from this negative of the yellow on a wet plate, this positive being of the exact size of the copy. This gives a positive of the yellows and blacks of the original. This positive C (Fig. 3) is then bleached in a mercuric chloride solution, blackened with ammonia water, varnished and dried. When this positive correction plate C is placed in contact with the original, all the yellows in the colors of the original will be intensified with black in varying degrees or proportions, while the blacks of the original, while they are actually covered by the positive corrective plate, will appear no different from what they did before the corrective plate was placed in front of the original.

A negative D (Fig. 5) now made from the original for the yellow printing plate will show better and truer results in the yellows than such a negative made without the corrective plate. Any style or kind of negative may be made from the copy when it is modified or corrected by the corrective plate. For example, a continuous toned negative may be made through a color filter on a color sensitive plate for the indirect process, or a screen negative through a cross-line or a grain process screen and a filter color screen may be made by one operation on a color sensitive plate for the direct process.

In Fig. 4 the original A is shown on the copyboard 10 of a camera with the correction plate C in contact therewith, both being held in position by any suitable clamp or clip 11. The plate for negative D is being exposed within the camera 12, and is later developed into negative D, Fig. 5, from which the printing plate may be made.

The application of the invention to the making of the different negatives for the various printing plates for all the colors will be understood from the description of the foregoing described specific example, as will also the effect of the corrective plate whether a particular color component of the original is represented therein by either white (produced by using the mercury intensifier) or black (produced by subsequent ammonia treatment); the color effect in the negative being just the reverse in the two instances. It will also be clear that a color or a color change or correction may be represented in the corrective plate by an intermediate tone, that is by a translucent white or translucent dark tone in the particular or corresponding part of the corrective plate, as the case may be.

The term design as used herein signifies the subject matter of the colored original, whether it be a painting, colored drawing, an article, or any other thing which is to be reproduced in the color printing plates.

It will be understood that departures may be made from the specific manner of practicing the invention and the means employed therewith, within the scope of the accompanying claims, without departing from the principles of the invention and without sacrificing its chief advantages.

What I claim is:—

1. For use in making photo-mechanical printing plates a photographic corrective plate the same size as and in contact with the original and carrying a part or the whole of the design of the original thereon in form to modify the color values in a negative of the original made through the corrective plate.

2. For use in making photo-mechanical printing plates a photographic corrective plate the same size as and in contact with the original and carrying a part or the whole of the design of the original thereon, and representing one of the primary color components of the original design, in form to modify the color values in a negative of the original made through the corrective plate.

3. For use in making photo-mechanical printing plates a photographic corrective plate the same size as and in contact with the original and carrying an opaque part or the whole of the design of the original thereon in form to modify the color values in a negative of the original made through the corrective plate.

4. For use in making photo-mechanical printing plates a photographic corrective plate the same size as and in contact with the original and carrying an opaque part or the whole of the design of the original thereon, and representing one of the primary color components of the original design, in form to modify the color values in a negative of the original made through the corrective plate.

5. For use in making photo-mechanical printing plates a photographic corrective plate the same size as and in contact with the original and carrying a white opaque part or the whole of the design of the original thereon in form to modify the color values in a negative of the original made through the corrective plate.

6. For use in making photo-mechanical printing plates a photographic corrective plate the same size as and in contact with the original and carrying a white opaque part or the whole of the design of the original thereon, and representing one of the primary color components of the original design, in form to modify the color values in a negative of the original made through the corrective plate.

7. For use in making photo-mechanical printing plates a photographic corrective plate the same size as and in contact with the original and carrying a black opaque part or the whole of the design of the original thereon in form to modify the color values in a negative of the original made through the corrective plate.

8. For use in making photo-mechanical printing plates a photographic corrective plate the same size as and in contact with the original and carrying a black opaque part or the whole of the design of the original thereon, and representing one of the primary color components of the original design, in form to modify the color values in a negative of the original made through the corrective plate.

9. For use in making photo-mechanical printing plates a photographic corrective plate partly at least translucent or transparent, the same size as and in contact with the original and carrying a part or the whole of the design of the original thereon in form to modify the color values in a negative of the original made through the corrective plate.

10. For use in making photo-mechanical printing plates a photographic corrective plate partly at least translucent or transparent, the same size as and in contact with the original and carrying a part or the whole of the design of the original thereon, and representing one of the primary color components of the original design, in form to modify the color values in a negative of the original made through the corrective plate.

11. For use in making photo-mechanical printing plates a photographic corrective plate to be interposed between the original and a negative to be made therefrom and carrying a part or the whole of the design of the original thereon in form to modify the color values in a negative of the original made through the corrective plate.

12. For use in making photo-mechanical printing plates a photographic corrective plate to be interposed between the original and a negative to be made therefrom and carrying a part or the whole of the design of the original thereon, and representing one of the primary color components of the original design, in form to modify the color values in a negative of the original made through the corrective plate.

13. For use in making photo-mechanical printing plates a photographic corrective plate to be interposed between the original and a negative to be made therefrom and carrying an opaque part or the whole of the design of the original thereon in form to modify the color values in a negative of the original made through the corrective plate.

14. For use in making photo-mechanical printing plates a photographic corrective plate to be interposed between the original and a negative to be made therefrom and carrying an opaque part or the whole of the design of the original thereon, and representing one of the primary color components of the original design, in form to modify the color values in a negative of the original made through the corrective plate.

15. For use in making photo-mechanical printing plates a photographic corrective plate partly at least translucent or transparent, to be interposed between the original and a negative to be made therefrom and carrying a part or the whole of the design of the original thereon in form to modify the color values in a negative of the original made through the corrective plate.

16. For use in making photo-mechanical printing plates a corrective plate partly at least translucent or transparent, to be interposed between the original and a negative to be made therefrom and carrying a part or the whole of the design of the original thereon, and representing one of the primary color components of the original design, in form to modify the color values in a negative of the original made through the corrective plate.

17. The process of making photo-mechanical printing plates which comprises making a color negative from the original by color corrective means, making a corrective plate embodying the color corrections from the negative, making a negative with true color values from the original through the corrective plate, and making a printing plate from said true color negative.

18. The process of making photo-mechanical printing plates which comprises making a small negative from the original by color corrective means, making an enlarged corrective plate from such color corrected negative, embodying the color corrections from the negative, and of the exact size of the original, placing the corrective plate in contact with the original, making a negative with true color values from the original through the corrective plate, and making a printing plate from said true color negative.

19. For use in photo-mechanical process work, a photographic color corrective positive or negative on a transparent support in register with the design of the original as to size and position and in contact with the face of the original.

20. For use in photo-mechanical process work, a photographic color corrective positive or negative on a transparent support in register with the design of the original as to size and position.

21. For use in photo-mechanical process work, a photographic corrective positive or negative corresponding wholly or in part to an original and bleached white so as to eliminate color from a final negative.

22. For use in photo-mechanical process work, a photographic corrective photographic positive or negative corresponding wholly or in part to an original and blackened so as to emphasize certain color values in the final negative.

23. For use in photo-mechanical process work, a photographic corrective photographic positive or negative of the same size as the original and carrying only certain portions of the design of an original and used to correct only certain portions of the original in the final negative.

24. The process of making a color negative for color printing plates which comprises photographing an original through a corrective positive or negative in register with the original.

25. The process of making a color negative for color printing plates which comprises photographing an original through a corrective positive or negative in register and in contact with the original.

26. The process of photographing an object upon a sensitive medium which comprises intercepting rays from high light portions of the object corresponding to certain colors to prevent such rays from reaching the sensitive medium while causing other rays from the object to act upon the medium.

27. The process of photographing an object upon a sensitive medium which comprises intercepting rays from high light portions of the object corresponding to certain colors to prevent such rays from reaching the sensitive medium, and also causing rays from both high and the lower light portions of the object to act upon the medium.

In testimony whereof, I have signed my name to this specification.

JOSEPH A. H. HATT.